United States Patent Office 3,434,576
Patented Mar. 25, 1969

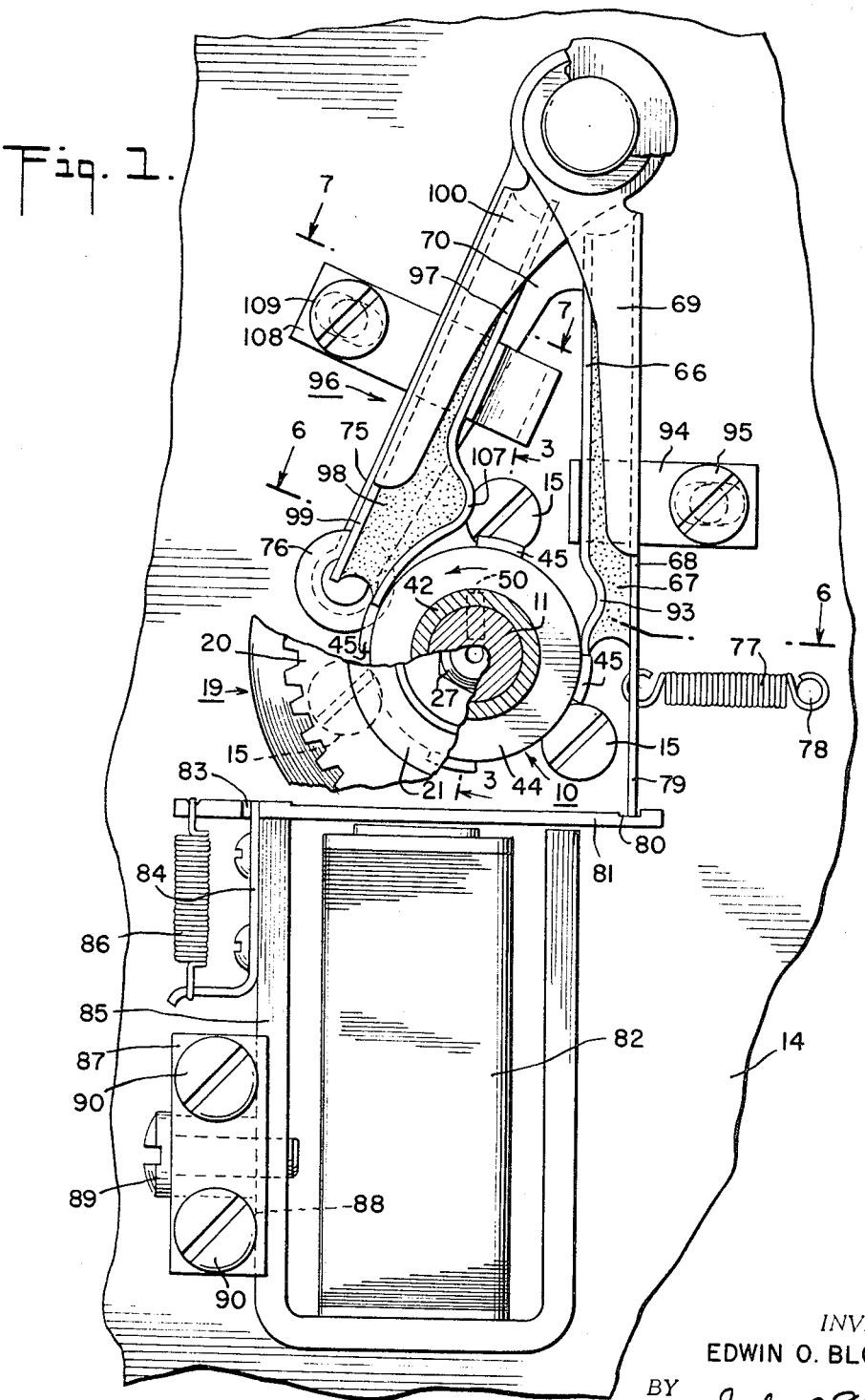
Fig. 1.
INVENTOR.
EDWIN O. BLODGETT
BY
ATTORNEY

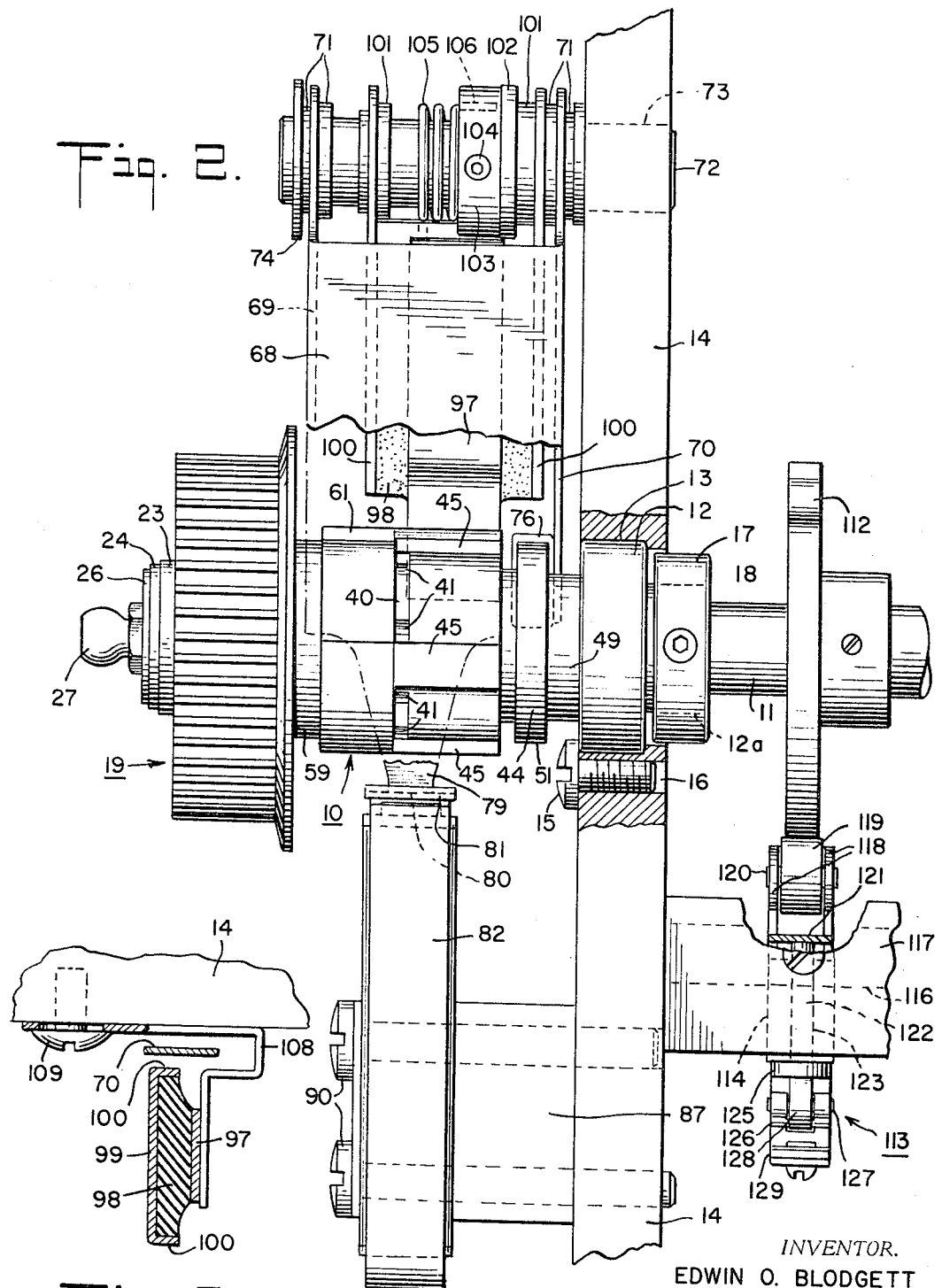

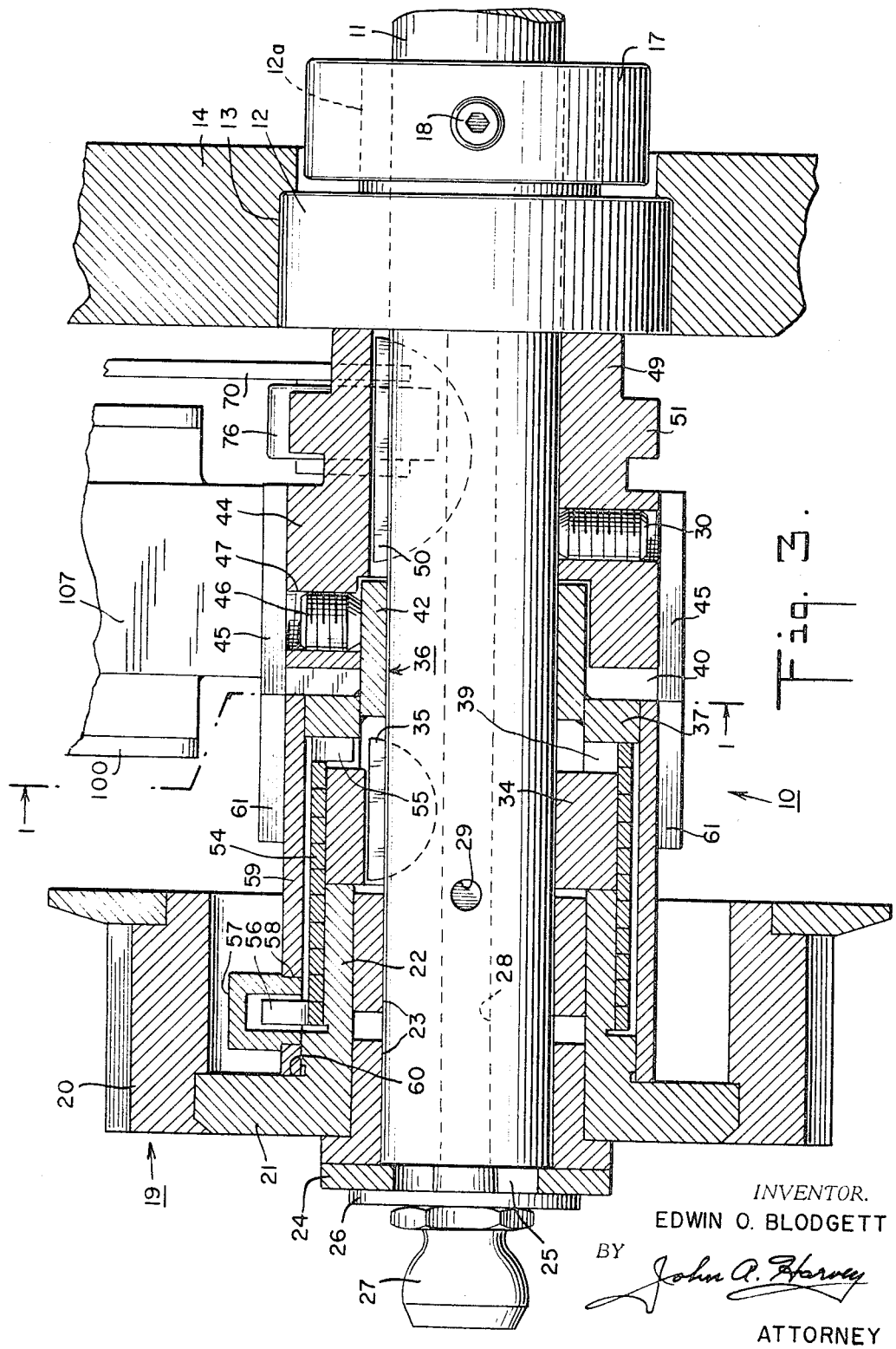

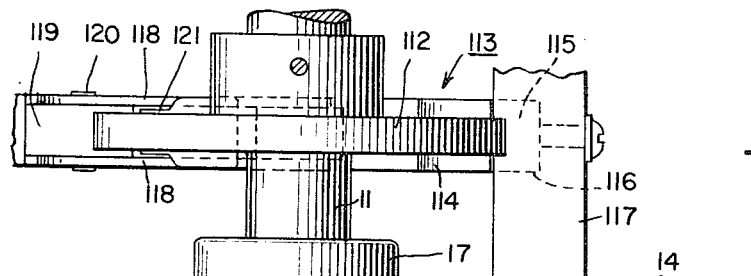
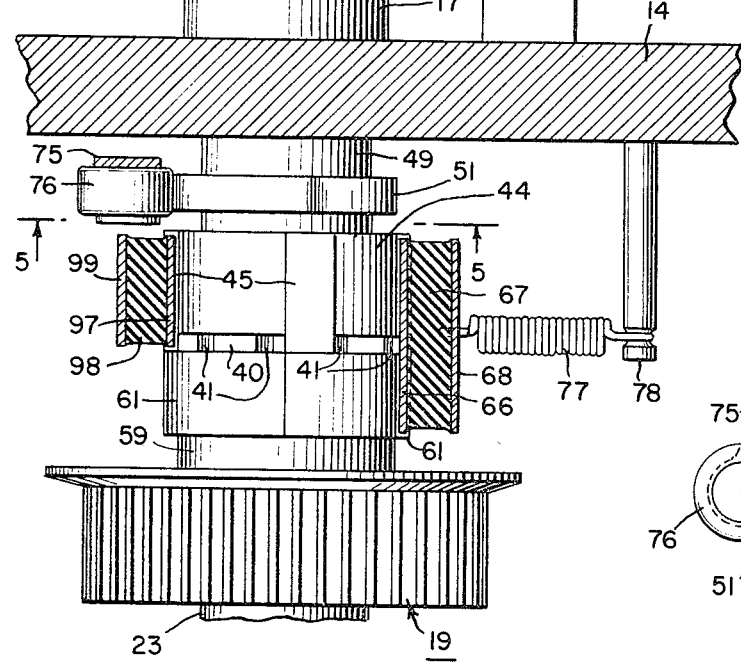
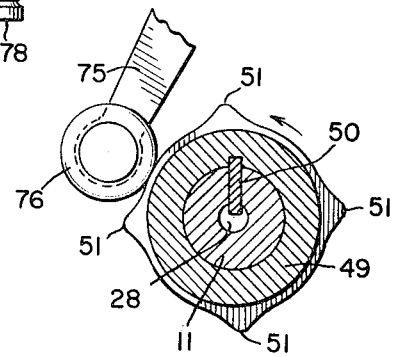
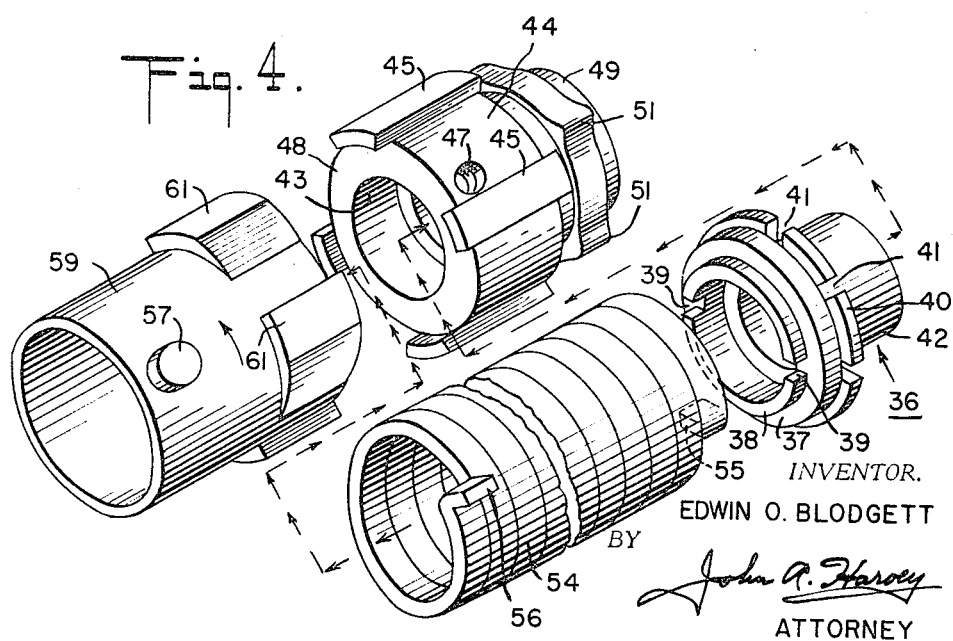

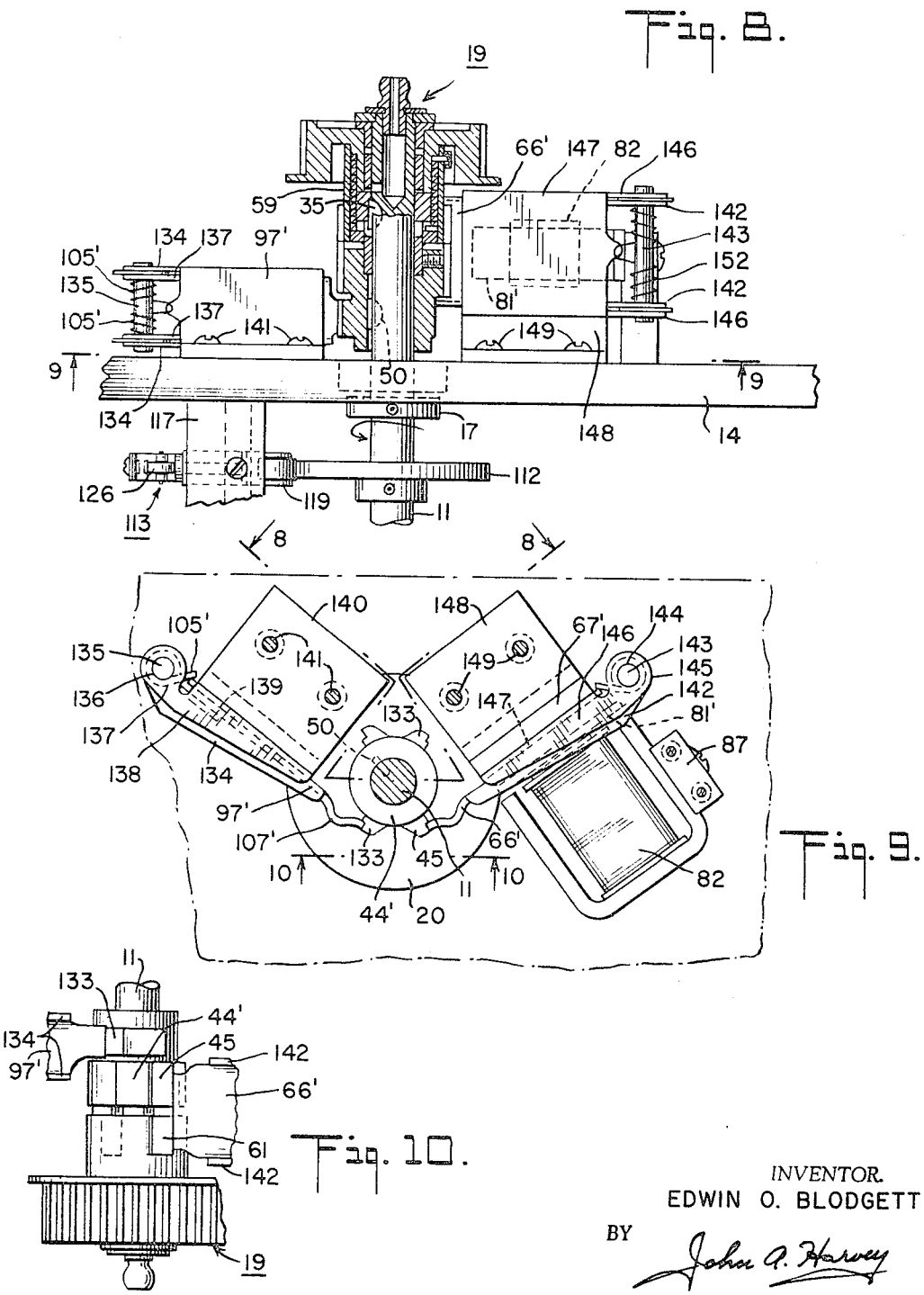

3,434,576
COIL CLUTCH WITH LATCH AND POSITION BRAKE
Edwin O. Blodgett, Rochester, N.Y., assignor to Friden, Inc., a corporation of Delaware
Filed Mar. 31, 1967, Ser. No. 627,377
Int. Cl. F16d 67/02, 11/06, 13/04
U.S. Cl. 192—12                    15 Claims

ABSTRACT OF THE DISCLOSURE

A clutch having a helical wire spring encircling cylindrical driving and driven members. One end of the spring is secured to a clutch disconnect sleeve housing having external clutch-control protuberances. The other end of the spring is affixed to a sleeve secured to the shaft. A stop member is secured to the shaft and has external stop protuberances. Interruption of clutch drive is effected by a clutch control member which engageably spans both the protuberances and is movable into and out of engagement therewith to halt rotational movement thereof. Upon moving into engageable relation with the protuberances, the stop member first engages a protuberance on the housing to halt the latter and unwrap the spring from the driving member, to effect interruption of clutch drive of the driven shaft, and thereafter is engaged by the protuberance on the stop member to halt the driven shaft at a preselected precise angular position. A cam operated detent member thereupon engages a stop member protuberance to resist the tendency of the spring to return to wrapped driving engagement.

The present invention relates to helical spring wire clutches used to provide relatively easily and rapidly effected clutch control of the mechanical driving connection between a driving member and a driven member.

Helical wire spring clutches heretofore proposed have utilized a helical wire spring coil encircling both a cylindrical driving member often rotatably journaled on a driven shaft and a cylindrical driven member secured to the shaft. A cylindrical tubular housing usually encloses the spring coil and is concentrically supported relative to the shaft axis for rotation with the shaft while being permitted a limited range of angular motion relative to the shaft. One end of the spring coil is secured to the cylindrical driven member and the other end is affixed to the housing. The latter is provided with external clutch-control protuberances which are selectively engageable by a clutch control member movable into and out of engaging relation therewith. Engagement of the clutch control member with a housing protuberance halts rotation of the housing to cause the coil spring to unwrap from the cylindrical driving member and thus interrupt clutch drive of the driven shaft. The latter is thereupon halted by the drag of the driven load or by the spring coil, which being connected between the now halted housing and driven shaft, either furnishes a sufficient halt bias force or is expanded into engagement with the inner surface of the housing by the inertia of the driven shaft and the mechanical components comprising the driven load.

Where in using the prior helical spring wire clutch constructions reliance is placed upon the driven load to halt the driven shaft after clutch disengagement, the precise halt angular position of the driven shaft becomes uncertain by reason of prevailing variations of factors affecting the magnitude of the driven load. Further, the inertial mass of the driven load must be limited to a value such that it does not cause fracture of the spring coil after the latter has fully expanded into engagement with the inner surface of the tubular housing. These considerations often limit the application of this form of clutch to the drive of sufficiently light loads as to permit the halting of the driven shaft simply by the bias force of the spring coil, usually accompanied by a reverse direction rotation of the driven shaft by such force and through a limited angular range to effect final halt by engagement of a detent member with a stop protuberance provided on a sleeve secured to the driven shaft. In these light-load clutch applications, the stop angular position of the driven shaft is relatively uncertain if such halt is effected simply by the spring coil bias force without accompanying bias-force reverse rotation of the driven shaft to engage a detent member and a stop protuberance as earlier mentioned. Thus the angular stop position of the driven shaft may undesirably vary in many applications with the magnitude of the driven load, undesirably limited in value such as not to result in spring coil fracture, or halt of the driven shaft may often be unduly prolonged for certain applications by reason of the time interval required to initiate interruption of the clutch drive and the actual halt of the driven shaft after reverse rotation to effect engagement between a detent member and a stop protuberance.

For certain applications, the prior helical spring clutch constructions have the disadvantage of also placing a minimum limit upon the inertial mass of the driven shaft and its connected load such as to insure adequate unwrapping of the spring coil from the cylindrical driving member accompanied by sufficient forward inertial displacement of the driven shaft to enable detent member motion into engageable relation with a stop protuberance.

It is an object of the invention to provide a new and improved helical spring wire clutch which avoids one or more of the disadvantages and limitations of prior such clutches.

It is a further object of the invention to provide an improved helical spring wire clutch which is characterized by clutch controlled abrupt halt of a driven shaft consistently and precisely effected at a preselected angular position and in minimized time after initiation of clutch control.

It is an additional object of the invention to provide a novel helical spring wire clutch which permits clutch-control drive of loads having substantially larger values of inertial mass than heretofore safely permitted without danger of clutch failure, and one providing improved and more positively effected clutch control than heretofore available irrrespective of the magnitude and inertial mass of the driven load.

Other objects and advantages of the invention will appear as the detailed description thereof proceeds in the light of the drawings forming a part of this application and in which:

FIG. 1 is a side elevational view partly in cross-section of a helical spring wire clutch embodying the present invention, and FIG. 2 is a side elevational view partially in cross-section and with partially broken away structures further illustrating the clutch construction;

FIG. 3 is an elevational cross-sectional view illustrating the internal construction of an assembly used in the clutch construction;

FIG. 4 illustrates in isometric view the configuration of certain internal components in the clutch assembly;

FIG. 5 is a cross-sectional fragmentary view illustrating the configuration of cam lobes and the cooperative relation thereto of a cam follower used in the clutch construction;

FIG. 6 is a top view partially cross-sectioned of the clutch assembly;

FIG. 7 is a fragmentary cross-sectional view illustrating the configuration of a stop bracket used in association with a detent structure of the clutch;

FIG. 8 is a plan view partially in cross-section of a helical spring wired clutch embodying the invention in a modified form;

FIG. 9 is an end elevational view of the modified form of clutch illustrated in FIG. 8; and FIG. 10 is a fragmentary bottom view taken along the plane 9—9 of FIG. 9.

Referring now more particularly to FIGS. 1–3 of the drawings, a representative helical wire spring clutch embodying the present invention has an assembly of clutch elements 10 supported on a driven shaft 11. The latter is rotationally supported at one end by a ball or roller bearing assembly 12 received in an aperture 13 of a rigid metal baseplate 14, the bearing assembly 12 being retained in the aperture 13 by machine screws 15 threaded into internally threaded apertures 16 of the baseplate 14. The bearing assembly 12 is positionally fixedly retained longitudinally on the shaft 11 by a collar 17 which is positioned over a laterally extending slit-collet form of inner race 12a of the assembly 12 and clamps the inner race to the shaft 11 by means of a set screw 18 threaded through the collar 17 to engage the inner race 12a.

The clutch assembly 10 is shown by way of example as being driven by a conventional form of belt pulley 19 having a transversely grooved peripheral surface adapted to be coupled by a conventional laterally ribbed belt (not shown) to a suitable source of rotational drive power (also not shown). As will be more clearly evident from FIG. 3, the pulley 19 is comprised by a cylindrical member 20 having the transversely grooved peripheral surface last mentioned and which is concentrically affixed on a flanged end 21 of a stepped driving sleeve 22 rotationally supported on the shaft 11 by an end-flanged sleeve bearing member 23. The flange of the latter abuts a bearing washer 24 positioned on a stepped-down end portion 25 of the shaft 11 and retained in place thereon by a washer 26 and a grease pressure nipple 27. The latter is screwed into an internally threaded end portion of an axially bored grease distribution duct 28 communicating with radial grease distribution apertures 29.

The clutch assembly 10 abuts against the end of the pulley sleeve 22 to maintain the pulley 19 in position on the bearing member 23. This assembly includes a cylindrical driven sleeve 34 fixed to the shaft 11 by a key 35 and abutting against a stepped sleeve 36 shown more clearly in FIG. 4. This sleeve is conveniently fabricated by a metal ring 37 having on one side a reduced-diameter shoulder 38 provided with diametrically-opposed slots 39 and having on its other side an enlarged flange 40 provided with equally spaced radial slots 41, the ring 37 being seated upon and brazed to the end of a sleeve 42. The exposed end of the sleeve 42 is received within a concentric end bore 43 of a stop member 44, having a generally cylindrical configuration also shown more clearly in FIG. 4, provided with axially extending and equally spaced peripheral stop protuberances 45 having edge faces lying in planes which include the axis of the shaft 11. The clutch construction herein described by way of example is one of the 90° type operative to provide halt of the driven shaft 11 at each of precisely preselected 90° angular positions, and accordingly the stop member 44 is provided with four stop protuberances 45 spaced 90° apart. The diameter of the stop member 44 corresponds to the diameter of the flange 40 of the stepped ring 37. The stop protuberances 45 having end projections which, in the assembled clutch, project over the flange 40 with one or more of the slots 41 of the latter exposed between each adjacent pair of the stop protuberances 45 so that the slots 41 are accessible externally of the clutch for a purpose presently to be explained. A set screw 46 (FIG. 3) received in an internally threaded radial aperture 47 of the stop member 44 engages the sleeve 42 to retain the stepped sleeve 36 at an angular position on the shaft 11 to which the stepped sleeve 36 is adjusted in a manner and for a purpose presently to be explained. As thus arranged, the face 48 of the stop member 44 abuts the face of the flange 40 of the stepped sleeve 36. The stop member 44 is secured in position longitudinally of the shaft 11 by a set screw 30 and includes a reduced-diameter end portion 49 which is keyed to the shaft 11 by a key 50. The end portion 49 has formed on its peripheral surface four 90° spaced cam lobes 51 having a lobe configuration and relative angular position shown more clearly in FIG. 5 and which are provided for a purpose presently to be explained. The end of the stop member end portion 49 abuts against the inner race of the ball bearing assembly 12 to maintain the clutch assembly 10 in position on the end of the shaft 11 between the bearing washer 24 and the bearing assembly 12.

A close-wound helical wire spring 54, formed from a tempered spring steel strip of rectangular cross-section, is positioned over the pulley driving sleeve 22 and the driven sleeve 34 as shown in FIG. 3. The spring 54 has one end 55 turned radially inwardly to be received in a slot 39 of the stepped sleeve 36, which thus serves as an anchor member for this end of the spring, and has its other end 56 turned radially outwardly to be received within a hollow cylindrical housing 57 seated in an aperture 58 provided in a cylindrical housing 59 journaled at one end on an enlarged shoulder 60 of the pulley sleeve 22 and journaled at its opposite end on the shoulder 38 of the stepped sleeve 36. The ends of the housing 59 abut the inner face of the pulley flange 21 and the face of the enlarged flange 40 of the stepped sleeve 36 as shown in FIG. 3. As shown more clearly in FIG. 4, the housing 59 has four equally spaced and axially extending peripheral protuberances 61 positioned at one end of the housing in end-abutting relation to the ends of the stop protuberances 45 of the stop member 44. The forward edge surfaces of the protuberances 61 in the direction of shaft rotation have 90° angular spacings and lie in planes which include the axis of the shaft 11, whereas the rearward edge surfaces of these protuberances are sloped as shown.

The housing 59 with its protuberances 61 operates as a clutch disconnect member, and to this end its protuberances may be selectably engaged by an elongated blunt-end knife-like clutch control member 66 resiliently supported by a stiff rubber pad 67 bonded between the member 66 and a pivotal support member 68 as shown more clearly in FIG. 1. The member 68 has turned-over side flanges 69 and 70 which are apertured at one end to receive press-fit bushings 71 which pivotally support the member 68 on a relatively rigid shouldered stud 72 secured in an aperture 73 of the baseplate 14 as shown more clearly in FIG. 2. A C retaining clip 74, engaging a peripheral groove provided near the end of the stud 72, retains the support member 68 in position on the stud 72. The side flange 70 of the support member 68 is of a V configuration as shown in FIG. 1 to provide a dependent arm 75 which rotationally supports a cam follower roller 76 at its free end. A tension spring 77 anchored between the support member 68 and a stud 78 on the baseplate 14 urges the cam follower roller 76 into engagement with the cam lobes 51 of the stop member 44, but such engagement may be prevented by latched engagement of the free end 79 of the support member 68 with a latch notch 80 provided near the end of an armature 81 of a clutch control electromagnet 82. The armature 81 has an aperture 83 for pivotal support by a bracket 84 secured on the end of one arm of an E-shaped magnetic yoke 85 of the electromagnet structure as shown, and is normally biased by a tension spring 86 into latching engagement with the free end 79 of the support member 68. A support block 87 having a groove 88 in one face thereof to receive one arm of the yoke 85 is secured to such arm by a machine screw 89 and is secured by machine screws 90 to the baseplate 14 to support the electromagnet structure on the baseplate.

As shown in FIGS. 1 and 6, the clutch control member 66 has a blunt end of sufficient width as to span the protuberances 45 and 61 provided on the stop member 44 and the housing 59, respectively, and engages these protuberances when the free end 79 of the support member 68 is held in latched engagement with the latch notch 80 of the armature 81. A corrugation 93 provided near the blunt end of the clutch control member 66 provides clearance between the latter and the protuberances 45 and 61 as soon as the protuberances have moved through the angle of approximately 40° after clutch drive of the output shaft 11 has been initiated, thus permitting earlier return of the member 66 to engage its blunt end with the next following protuberances 45 and 61 of the respective stop member 44 and housing 59 and thereby ensure consistently reliable selectable clutch disengagement after each 90° rotational drive of the output shaft 11. The corrugation 93 also helps prevent buckling of the control member 66 during the process of vulcanizing the rubber pad 67 to it. The lobes 51 of the member 44 are so angularly positioned with respect to the protuberances 45 of this member that the cam follower roller 76, operating through the dependent arm 75, (1) moves the free end 79 of the support member 68 into latchable engagement with the latch notch 80 of the armature 81 and (2) concurrently moves the end of the clutch control member 66 to a position where it may engage the protuberances of the stop member 44 and the housing 59 a brief interval later when the yet approaching protuberances move into engagement with the blunt end of the clutch control member 66. This cam-roller actuated movement of the clutch control member 66 into a position where it can engage with the protuberances is so limited by an L-shaped bracket 94, secured by a machine screw 95 to the baseplate 14, that the end of the member 66 is spaced a small amount from the peripheral surfaces of the stop member 44 and housing 59. When so positioned, the free end 79 of the member 68 is spaced a small amount from the right hand end (as seen in FIG. 1) of the armatured latch notch 80 so that pivotal movement of the armature 81 is not restrained by any latch pressure between the free end 79 and armatured notch 80. This allows faster operation of the electromagnet 82 and allows it to be operated with less power. If the electromagnet 82 is deenergized at this time, the free end 79 of the member 68 subsequently becomes latched by the latch notch 80 of the armature 81 when the cam roller rolls off of the cam lobe 51 concerned so that the clutch control member 66 remains positioned to engage the protuberances 45 and 61 of the respective member 44 and the housing 59 after the cam lobe 51 rotates beyond the cam follower roller 76. If, on the other hand, the electromagnet 82 is energized to attract its armature 81 at the time of cam positioning of clutch control member 66 as just described the free end 79 of the member 68 remains unlatched so that the cam roller 76 in rolling off of the cam lobe 51 concerned permits the tension spring 77 to pivot the member 68 counterclockwise as seen in FIG. 1 to move the end of the clutch control member 66 out of engageable relation with the protuberances 45 and 61. This occurs prior to the time when these protuberances might otherwise engage the clutch control member 66.

Clutch disengagement is effected when the clutch control member 66 concurrently engages both a protuberance 61 of the housing 59 and a protuberance 45 of the member 44. It is desired at this time that the helical wire spring 54 be unwrapped from the stepped driving sleeve 22 and the driven sleeve 34 keyed to the shaft 11, thus to interrupt the driving mechanical connection provided by the spring 54 between the sleeve 22 and the sleeve 34. To this end, the clutch is initially adjusted by loosening the set screw 46 of the member 44 in the quiescent state of the clutch wherein the pulley 19 is stationary and for the condition that the free end 79 of the member 68 is released from latching engagement with the latch notch 80 of the armature 81. A tool is now inserted to engage a notch 41 of the flange 40 and adjust the angular position of the stepped sleeve 36 such that a protuberance 61 of the housing 59 is positioned by the now wrapped spring 54 a small distance in advance of a corresponding protuberance 45 of the member 44 in the direction of the driven shaft rotation. This angularly adjusted position of the stepped sleeve 36 is then fixed by tightening the set screw 46 of the member 44 against the sleeve 42 of the stepped sleeve 36. Thereafter the member 44 and stepped sleeve 36, being both secured to the driven shaft 11, together, comprise a stop structure fixedly secured on the shaft for rotation therewith. It will be evident that this stop structure includes adjusting means, comprised by the plurality of peripheral spaced notches 41 in the flange 40 and by the set screw 46 both accessible externally of the clutch, to secure the stepped sleeve 36 in a fixed angularly adjusted position on the shaft 11 and thus anchor the end 55 of the wire spring 54 at a preselected angular position on the shaft.

In the operative drive state of the clutch when the drive force of the pulley 19 is transmitted through the clutch to drive the shaft 11, positioning of the clutch control member 66 to engage corresponding protuberances 45 and 61 of the respective member 44 and housing 59 effects initial engagement of a protuberance 61 with the end of the control member 66 followed shortly thereafter by engagement of the corresponding protuberance 45 with the latter member. The initial engagement of a protuberance 61 with the control member 66 halts the housing 59 and begins to unwrap the helical wire spring 54 from the driving sleeve 22 and the driven sleeve 34 with continued inertial rotation of the driven shaft 11 and stepped sleeve 36 secured to the shaft. When the corresponding protuberance 45 of the member 44 thereafter engages the control member 66, the helical wire spring 54 has been unwrapped from the sleeve 22 and 34 thus interrupting the mechanical drive connection between the sleeves and at the same time halting the driven shaft 11 at a precise preselectable angular position established by the engaged position of a protuberance 45 with the clutch control member 66. The driven shaft 11 is maintained in its halted angular position by a detent structure 96 next to be described.

The detent structure 96 includes an elongated detent member 97 which is supported by a stiff rubber pad 98 bonded between the member 97 and a support member 99 having overturned side flanges 100 apertured at one end to receive pressed-fit bushings 101 for pivotal support upon the stud 72. The support member 99 is maintained in position on the stud 72 by a washer 102 positioned between the adjacent bushing 101 and a collar 103 fixedly secured by a set screw 104 on the stud 72. A helical spring 105, having one end received in an aperture 106 of the collar 103 and having its other end engaging the support member 99, biases the detent structure 96 toward the clutch. As more clearly shown in FIG. 6, the blunt end of the detent member 97 is only sufficiently wide to engage the protuberances 45 of the member 44 and under bias of the spring 105 engages that one of the protuberances 45 which is positioned diametrically opposite the protuberance 45 engaged by the clutch control member 66 and which effected halt of the driven shaft 11 as previously explained. The detent end of the detent member 97 is provided with a transverse corrugation 107 having the configuration shown in FIG. 1 and which during clutch drive of the output shaft 11 is engaged by successive ones of the protuberances 45 of the member 44 pivotally to move the detent structure 96 clockwise as seen in FIG. 1 to permit the protuberances 45 to pass under the end of the detent member 97. Upon halt of the output driven shaft 11 by the clutch control member 66 in the manner previously explained, the detent structure 96 is pivoted by the helical spring 105 counterclockwise as seen in FIG. 1 immediately to move the blunt end of the detent member 97 into engaged relation with a protuberance 45 of the member 44. This locks the shaft 11 at its precisely preselected angular position of halt and maintains the helical wire spring 54 in an unwrapped state by preventing reverse rotation of the shaft as might otherwise occur by reason of the unwrapped and thus tensioned state of the helical wire spring. The counterclockwise angular positioning of the detent structure 96 by the bias spring 105 is limited by a bracket 108, having the configuration shown in FIG. 7 and which is secured by a machine screw 109 to the baseplate 14, such that the detent end of the detent member 97 is spaced a small distance from the peripheral surface of the member 44.

After halt of the output driven shaft 11 by interruption of the mechanical drive through the clutch 10 as just described, energization of the electromagnet 82 to attract its armature 81 unlatches the free end 79 of the support member 68 which thereupon pivots counterclockwise as seen in FIG. 1 under bias of the tension spring 77. This pivotal motion is so limited by engagement of the came follower roller 76 with the peripheral surface of the member 44 that the free end 79 of the member 68 engages the end of the armature 81 to the right of the notch 80 as seen in FIG. 1. The end of the clutch control member 66 is thereby moved out of engagement with the protuberances 45 and 61 of the respective member 44 and sleeve 59, whereupon the unwrapped and thus tensioned helical wire spring 54 is able to rotate the housing 59 in the direction of drive of the output shaft 11. This permits the helical wire spring 54 once more to contract into wrapped engagement with the driving sleeve 22 and the driven sleeve 34, thereby to reestablish the driving connection between these sleeves with consequent rotational drive of the output shaft 11.

In order that energizations of the electromagnet 82 may be correlated with relation to angular halt positions of the output driven shaft 11, as is preferable in many applications, a cam 112 (FIGS. 2 and 6) may be secured on the driven shaft 11 to operate an electrical contact subassembly 113 which may conveniently be of the type more fully disclosed and described in relation to FIGS. 2 and 3 of the Blodgett U.S. Patent No. 2,927,158. Briefly considered, this subassembly includes a base casting 114 having a tongue 115 received in and oriented by a groove 116 of a support pedestal 117 secured in any convenient manner to the base plate 14. The base casting 114 pivotally supports a pair of spaced arms 118 between the ends of which a cam follower roller 119 is rotationally supported upon a pin 120. A U-shaped member 121 secured to the arms 118 engages a push rod 122 reciprocally guided by an aperture 123 in the base casting 114 and having an enlarged head 125 which engages a roller 126 rotationally supported by a pin 127 at the end of a resilient leaf spring electrical contact 128 supported by electrical insulating material (not shown) on the base casting 114. A lobe of the cam 112 pivots the arms 118 and member 121 downward as seen in FIG. 2, and this movement through the push rod 122 moves the electrical contact 128 to engage a fixed electrical contact 129 also supported by electrical insulating material on the base casting 114. The electromagnet 82 may thus be energized through the normally open electrical contacts 128 and 129 of the subassembly 113. The cam lobes of the cam 112 have such configuration and angular positioning with relation to the angualr positions of the protuberances 45 and 61 that selectable energization of the electromagnet 82 may be effected over a preselected limited range of angular motion of the shaft 11 bracketing each halt position thereof. This energization range is preselected to enable energization of the electromagnet 82 not only at each halt position of the shaft 11 but also beginning at angular positions of the shaft 11 sufficiently early as to permit the clutch control member 66 to be moved by the spring 77 out of engageable relation with the protuberances 45 and 61 prior to the time when such protuberances would otherwise engage the clutch control member 66.

The clutch 10 described is one adapted to operate at relatively high rotational speeds of the driven pulley 19 yet to do so with consistently reliable clutch control at each of plural partial-revolution halt positions of the output driven shaft 11. This desirable operational characteristic is attained by reason of the cooperation of the cam lobes 51 and cam-follower structure comprised by the follower roller 76 and its supporting arm 75. These effect positive movement of the clutch control member 66 into a position where it can engage each succeeding pair of the protuberances 45 and 61 and concurrently effect positive movement of the free end 79 of the support member 68 into a position where it can be latched by the latch notch 80 of the armature 81. Should the electromagnet 82 be energized at this time, the cam lobes 51 are so angularly positioned in relation to the in-motion advanced angular positions of the protuberances 61 and the operating rotational speed of the clutch that the clutch control member 66 after its positioning as last described is quickly moved by the spring 77 out of such position prior to the time when the next protuberance 61 reaches a position where it could otherwise engage the clutch control member 66. By reason of the stiff resilient rubber pad support of the clutch control member 66 from the support member 68, the clutch is adapted to halt the driven shaft 11 at precisely preselectable positions even though the load connected to the shaft has a substantial value of inertial mass. Such halt of the shaft is effected without danger of fracture of the helical wire spring 54, which is merely unwrapped a sufficient amount to provide declutching action but is otherwise not involved in arresting the motion of the driven shaft 11. Each time that the driven shaft 11 is so halted, the spring-biased detent member 97 quickly moves into engagement with a protuberance 45 to retain the output shaft in its precisely halted angular position.

A modified form of helical spring wire clutch embodying the present invention is illustrated in FIGS. 8–10. This modified form of clutch is essentially similar to that just described, components corresponding to similar components of the clutch first described being designated by similar reference numerals and analogous components by similar reference numerals primed. The modified clutch is shown by way of example as being of the 180° type wherein two diametrically opposed protuberances 61 are provided on the cylindrical housing 59' and two corresponding protuberances 45 are provided on the stop member 44' although a larger number of such protuberances with equal angular spacings may be provided on the housing 59' and stop member 44' is desired for a particular application.

In the present clutch construction, the stop member 44' is provided with detent protuberances 133 displaced both axially and angularly from its stop protuberances 45 as shown. The detent protuberances 133 are engaged by the blunt end of the detent member 97' having a transverse corrugation 107' (provided for the same purpose and functioning essentially in the same manner as the corrugation 107 of the clutch construction first described) and down-turned edge flanges 134 extended and apertured for pivotal support of the detent member 97' on a support pin 135. The latter is secured in apertures 136 provided in the projected ends 137 of opposed flanges 138 formed by turning over the edges of a plate member 139 which is affixed by any suitable means (not shown) to an L-shaped bracket 140 secured by machine screws 141 to the base plate 14. As in the clutch first described, the helical wire spring 105' of the present clutch normally biases the detent member 97' into engageable relation with the detent protuberances 133 of the stop member 44'.

The stop member 44' of the present clutch has no cam lobes corresponding to the cam lobes 51 of the earlier described clutch since cam and cam-follower positioning of the clutch control member 66' is dispensed with in the present modified form of clutch. The clutch control member 66' of the present clutch is provided with stiffening down-turned side flanges 142 which are extended and apertured as shown for direct pivotal support of the member 66' upon a pin 143 which is secured in apertures 144 provided in the projected ends 145 of opposed flanges 146 formed by turning over the edges of a plate member 147. The latter is resiliently supported by a stiff rubber pad 67' bonded, as by vulcanizing, between the plate member 147 and a rigid L-shaped bracket 148 secured by machine screws 149 to the base plate 14. The clutch control member 66' is biased by a helical spring 152 into a position where it normally may engage corresponding ones of the protuberances 45 and 61, as illustrated in FIG. 10, to effect clutch disengagement in the manner earlier described in relation to the clutch construction of FIGS. 1–7. The clutch control member 66' is withdrawn from such engagement to initiate clutch drive of the output shaft 11, or is retained in a position out of engageable relation with the protuberances 45 and 61 to continue clutch engagement drive of the shaft 11 through two or more successive half revolutions, upon energization of the electromagnet 82 to attract its armature 81' which is fixedly secured between the side flanges 142 of the clutch control member 66' for pivotal movement therewith.

Aside from the differences in construction and operation explained just above, this modified form of clutch otherwise has the same construction and mode of operation described above in relation to FIGS. 1–7.

It will be apparent from the foregoing description of the invention that a helical spring wire clutch embodying the invention is characterized by clutch controlled abrupt halt of a driven shaft consistently and precisely effected at a preselected angular position and in minimized time after initiation of clutch control. A clutch embodying the invention has the further important advantage that it permits clutch-controlled drive of loads having substantially larger values of inertial mass than heretofore safely permitted without danger of clutch failure, and provides improved and more positively effected clutch control than heretofore available irrespective of the magnitude and inertial mass of the driven load.

While there have been described specific forms of the invention for purposes of illustration, it is contemplated that numerous changes may be made without departing from the spirit of the invention.

I claim:

1. A helical wire spring clutch comprising an output shaft,
   (a) a cylindrical drive sleeve journalled for rotation on said shaft and adapted to be mechanically coupled to a source of drive power,
   (b) a cylindrical driven sleeve concentrically secured on said shaft for rotational drive thereof,
   (c) a clutch disconnect member journalled for rotation on said shaft and having a peripheral protuberance,
   (d) a helical wire spring grippingly encircling said sleeves for mechanical drive connection of said drive sleeve to said driven sleeve and having one end effectively anchored to said disconnect member,
   (e) a stop structure fixedly secured on said shaft for rotation therewith and including a peripheral stop protuberance,
      (1) said stop structure anchoring the other end of said spring at a preselectable angular position on said shaft such that the protuberance of said disconnect member occupies an angular position leading the angular position of said stop structure protuberance in the direction of shaft rotation and during rotational drive thereof,
   (f) a clutch control member selectably movable between a first position out of engagement with said protuberances and a second position in which said control member initially engages said disconnect-member protuberance to halt rotation thereof and by continuing rotation of said stop structure cause said spring to unwrap from said driving sleeve for interruption of said driving connection and thereafter engages said stop-structure protuberance to halt said shaft at a precisely preselected angular position thereof at which said spring is unwrapped from said driving sleeve,
      (1) said clutch control member being normally spring biased to said first position thereof,
   (g) a member having a cam surface secured to said shaft and providing a cam lobe,
   (h) a cam follower engaging said cam surface and operable by said cam lobe mechanically to move said clutch control member to said second position thereof, and
   (i) clutch-control latch means operable selectably to latch said control member in and release said control member from said second position thereof.

2. A helical wire spring clutch according to claim 1 which includes a pivotal detent member movable upon halt of said shaft into engageable relation with a detent protuberance provided on a member secured to said shaft to retain said shaft against any significant amount of reverse rotation from said preselected angular position thereof.

3. A helical wire spring clutch according to claim 2 in which said detent member is normally spring biased into engageable relation with said detent protuberance and includes an elongated blade-like member pivotally supported upon a relatively rigid pivot member and having a blunt end portion engageable with said detent protuberance.

4. A helical wire spring clutch according to claim 2 in which said detent member is normally biased into said engageable relation with said detent protuberance and includes an elongated detent blade-like member supported with relatively stiff resilience on a pivoted support member and having a blunt end portion movable into the path of rotational motion of said detent protuberance and engageable therewith.

5. A helical wire spring clutch according to claim 2 in which said stop structure has plural diametrically opposed peripheral stop protuberances, and in which said clutch control member and said detent member are positioned for concurrent engagement with individual diametrically opposed ones of the stop protuberances of said stop structure.

6. A helical wire spring clutch according to claim 5 in which said clutch control member and said detent member include elongated blunt-end blade-like members supported for pivotal motion about a common axis and having the blunt ends thereof positioned on opposite sides of said clutch for concurrent engagement with said individual diametrically opposed ones of the stop protuberances of said stop structure.

7. A helical wire spring clutch according to claim 6 wherein said clutch control member is normally spring biased to said first position thereof and said stop structure has a peripheral cam surface providing plural diametrically opposed cam lobes, and which includes a pivoted cam follower engaging said cam surface and operable by said cam lobes mechanically to move said clutch control member to said second position thereof, and clutch-control latch means operable selectably to latch said control member in and release said control member from said second position thereof.

8. A helical wire spring clutch according to claim 7 in which said clutch control member includes an elongated blade-like member supported with relatively stiff resilience upon a pivoted support member and having a blunt end portion positioned tangential to the path of rotational motion of said disconnect and stop-structure protuberances and engageable in said second position of said clutch control member with said protuberances, and said clutch control latch means includes an electromagnet having an armature provided with a latch notch arranged in cooperative relation with the free end of said support member to latch said control member in and unlatch said control member from said second position thereof according to the respective deenergized and energized states of said electromagnet.

9. A helical wire spring clutch according to claim 1 in which said stop structure includes an anchor member anchoring said other end of said spring and having a sleeve journaled for rotation on said shaft and further includes adjustable means for securing said anchor member at an angular position on said shaft such that said other end of said spring is anchored at said preselectable angular position on said shaft.

10. A helical wire spring clutch according to claim 1 in which said clutch control member includes an elongated blade-like member supported with relatively stiff resilience upon a pivoted support member and having a blunt end portion movable into the path of rotational motion of said disconnect and stop structure protuberances and engageable in said second position of said clutch control member with said protuberances, and said clutch control latch means includes an electromagnet having an armature provided with a latch notch arranged in cooperative relation with the free end of said support member to latch said control member in and unlatch said control member from said second position thereof according to the respective deenergized and energized states of said electromagnet.

11. A helical wire spring clutch according to claim 1 in which said disconnect member and stop structure have equal numbers of plural peripheral and equally spaced protuberances with a protuberance of said disconnect member occupying said leading angular position in relation to a corresponding protuberance of said stop structure, and in which said cam surface is provided with a corresponding number of equally spaced cam lobes engaged by said cam follower to move said clutch control member to said second position thereof for selectably latched engagement thereby with each of said plural protuberances.

12. A helical wire spring clutch according to claim 1 wherein said clutch control member is normally spring biased to said second position thereof and includes an elongated blade-like member pivotally supported upon a relatively rigid pivot member and having a blunt end portion engageable with said disconnect member and stop-structure protuberances.

13. A helical wire spring clutch according to claim 1 wherein said disconnect member and stop structure have equal numbers of plural peripheral and equally spaced protuberances with a protuberance of said disconnect member occupying said leading angular position in relation to a corresponding protuberance of said stop structure.

14. A helical wire spring clutch according to claim 1 in which said stop structure includes an anchor member having an adjusting portion accessible externally of said clutch, and in which there is provided adjustable means including means on said adjusting portion of said anchor member for angularly adjusting the position thereof to an angular position on said shaft such that said other end of said spring is anchored at said preselectable angular position on said shaft, and means carried by said stop structure for securing said anchor member in said angular position on said shaft.

15. A helical wire spring clutch according to claim 14 in which said anchor member has a sleeve journaled for rotation on said shaft, in which said adjusting portion of said anchor member is comprised by a flange integral with and oriented normal to said anchor member sleeve, in which said stop structure includes a stop member having said peripheral stop protuberance, and in which said adjustable means includes a plurality of peripheral spaced notches on said flange and at least one machine set screw radially threaded through said stop member into engageable relation with said sleeve of said anchor member to secure said anchor member in said angular position on said shaft.

References Cited
UNITED STATES PATENTS

| | | | |
|---|---|---|---|
| 2,298,970 | 10/1942 | Russell et al. | 192—33 |
| 2,475,432 | 7/1949 | Marihart. | |
| 2,777,552 | 1/1957 | Flavin | 192—33 XR |
| 2,822,904 | 2/1958 | Cheatum | 192—26 |
| 3,337,015 | 8/1967 | Wagner. | |
| 3,340,975 | 9/1967 | Erickson | 192—33 X |

OTHER REFERENCES

Rex: IBM Technical Disclosure Bulletin, July 1961, page 6, volume 4, No. 2.

BENJAMIN W. WYCHE III, *Primary Examiner.*

U.S. Cl. X.R.

192—26, 33